(12) United States Patent
Sakai et al.

(10) Patent No.: US 12,146,528 B2
(45) Date of Patent: *Nov. 19, 2024

(54) ROTARY TABLE

(71) Applicant: NIPPON THOMPSON CO., LTD., Tokyo (JP)

(72) Inventors: Tetsuya Sakai, Toki (JP); Kousuke Tobari, Toki (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 17/758,752

(22) PCT Filed: Dec. 10, 2020

(86) PCT No.: PCT/JP2020/046103
§ 371 (c)(1),
(2) Date: Jul. 13, 2022

(87) PCT Pub. No.: WO2021/145112
PCT Pub. Date: Jul. 22, 2021

(65) Prior Publication Data
US 2023/0084834 A1  Mar. 16, 2023

(30) Foreign Application Priority Data

Jan. 17, 2020 (JP) .................. 2020-005903

(51) Int. Cl.
*F16C 33/66* (2006.01)
*A47B 13/08* (2006.01)
(Continued)

(52) U.S. Cl.
CPC ........ *F16C 33/6622* (2013.01); *A47B 13/081* (2013.01); *B23Q 1/52* (2013.01); *B23Q 11/12* (2013.01); *F16H 1/16* (2013.01)

(58) Field of Classification Search
CPC ..... F16C 33/6622; A47B 13/081; B23Q 1/52; B23Q 11/12; F16H 1/16
See application file for complete search history.

(56) References Cited

U.S. PATENT DOCUMENTS 4,827,790 A    5/1989  Bisiach
11,988,276 B2  5/2024  Sakai et al.
(Continued)

FOREIGN PATENT DOCUMENTS

CN    101476615 A    7/2009
CN    204041726 U    12/2014
(Continued)

*Primary Examiner* — Terence Boes
(74) *Attorney, Agent, or Firm* — Oliff PLC (57) ABSTRACT

A rotary table (1) includes a base body (10), a worm wheel (21), an inner ring (22), a plurality of rolling elements, and a worm screw unit (30). The worm screw unit (32) includes a worm screw (31) and a worm screw housing (32). The worm screw housing (32) has an opposing surface that faces an outer circumferential surface (21B) of the worm wheel (21). The worm screw housing (32) includes a flange portion (325) that protrudes from the opposing surface and covers a side face (215A) that, of the first gear (215) facing the opposing surface, is on the opposite side from the base body (10) in the axial direction of the worm wheel (21).

4 Claims, 11 Drawing Sheets

(51) Int. Cl.
*B23Q 1/52* (2006.01)
*B23Q 11/12* (2006.01)
*F16H 1/16* (2006.01)

(56) References Cited

U.S. PATENT DOCUMENTS

| | | |
|---|---|---|
| 2002/0048420 A1 | 4/2002 | Kato |
| 2017/0335923 A1 | 11/2017 | Smith et al. |
| 2019/0040945 A1 | 2/2019 | Ueda et al. |
| 2020/0003255 A1 | 1/2020 | Hirota et al. |
| 2023/0044626 A1* | 2/2023 | Sakai .................. B23Q 1/25 |

FOREIGN PATENT DOCUMENTS

| | | | |
|---|---|---|---|
| JP | 63149474 | A | 6/1988 |
| JP | 5026330 | A | 2/1993 |
| JP | 10132037 | A | 5/1998 |
| JP | 2005207532 | A | 8/2005 |
| JP | 2007092788 | A | 4/2007 |
| JP | 2011177841 | A | 9/2011 |
| JP | 2017096424 | A | 6/2017 |
| JP | 2018138787 | A | 9/2018 |
| WO | 2012075737 | A1 | 6/2012 |

\* cited by examiner

ROTARY TABLE

TECHNICAL FIELD

The present invention relates to a rotary table. The present application claims priority based on Japanese Patent Application No. 2020-005903 filed on Jan. 17, 2020, the entire contents of which are incorporated herein by reference.

BACKGROUND ART

A rotary table including a worm wheel having a first gear formed over the entire area in the circumferential direction and a worm screw having a second gear that meshes with the first gear is known (see, e.g., Patent Literature 1).

CITATION LIST

Patent Literature

Patent Literature 1: Japanese Patent Application Laid-Open No. 2011-177841

SUMMARY OF INVENTION

Technical Problem

In the above-described rotary table, it is preferable to reduce entry of foreign matter into the region where the first gear and the second gear come into contact. It is also preferable to reduce splattering of the grease to the outside of the rotary table. Therefore, one of the objects is to provide a rotary table capable of reducing entry of foreign matter into the region where the gear on the worm wheel and the gear on the worm screw come into contact and also reducing splattering of the grease to the outside.

Solution to Problem

A rotary table according to the present disclosure includes: a base body having a planar holding surface; a worm wheel disposed on the base body to be rotatable around an axis, the worm wheel having an outer circumferential surface with a first gear formed over an entire area in a circumferential direction: an inner ring disposed on an inner circumference side of the worm wheel and fixed to the base body; a plurality of rolling elements disposed to be able to roll on an inner circumferential surface of the worm wheel and an outer circumferential surface of the inner ring; and a worm screw unit fixed on the holding surface. The worm screw unit includes a worm screw held to be rotatable around an axis, the worm screw having a second gear meshing with the first gear, and a worm screw housing surrounding and holding the worm screw, the worm screw housing being fixed to contact the holding surface at a planar contacting surface thereof. The worm screw housing has an opposing surface facing the outer circumferential surface of the worm wheel. The opposing surface has a first through hole formed to expose the second gear. The worm screw housing includes a flange portion protruding from the opposing surface and covering a side face that, of the first gear facing the opposing surface, is on an opposite side from the base body in an axial direction of the worm wheel.

Advantageous Effects of Invention

According to the above rotary table, entry of foreign matter into the region where the gear on the worm wheel and the gear on the worm screw come into contact can be reduced, and splattering of the grease to the outside of the rotary table can also be reduced.

DESCRIPTION OF EMBODIMENTS

Outline of Embodiments

First, embodiments of the present disclosure will be listed and described. A rotary table of the present disclosure includes: a base body having a planar holding surface; a worm wheel disposed on the base body to be rotatable around an axis, the worm wheel having an outer circumferential surface with a first gear formed over an entire area in a circumferential direction; an inner ring disposed on an inner circumference side of the worm wheel and fixed to the base body; a plurality of rolling elements disposed to be able to roll on an inner circumferential surface of the worm wheel and an outer circumferential surface of the inner ring; and a worm screw unit fixed on the holding surface. The worm screw unit includes a worm screw held to be rotatable around an axis, the worm screw having a second gear meshing with the first gear, and a worm screw housing surrounding and holding the worm screw, the worm screw housing being fixed to contact the holding surface at a planar contacting surface thereof. The worm screw housing has an opposing surface facing the outer circumferential surface of the worm wheel. The opposing surface has a first through hole formed to expose the second gear. The worm screw housing includes a flange portion protruding from the opposing surface and covering a side face that, of the first gear facing the opposing surface, is on an opposite side from the base body in an axial direction of the worm wheel.

In the rotary table of the present disclosure, the second gear on the worm screw is surrounded by the worm screw housing. Further, the first gear that faces the opposing surface has its side face covered by the flange portion. Adopting such a configuration can reduce entry of foreign matter into the region where the first gear and the second gear come into contact and also reduce splattering of the grease to the outside of the rotary table. As such, according to the rotary table of the present disclosure, entry of foreign matter into the region where the gear on the worm wheel and the gear on the worm screw come into contact can be reduced, and splattering of the grease to the outside of the rotary table can also be reduced.

In the above rotary table, the worm screw housing may have a lubrication hole formed to penetrate from an outer wall other than the opposing surface to the opposing surface. The lubrication hole may have a first opening on the opposing surface. The first opening may be formed away from the first through hole in the circumferential direction of the worm wheel. With the lubrication hole thus formed, the first and second gears can be lubricated in the state where the worm screw housing is fixed to the base body. Further, performing the lubrication in the state where the worm wheel and the worm screw are rotating facilitates lubrication on the region where the first gear and the second gear come into contact.

The above rotary table may further include a cover member disposed to surround the first gear and fixed to the base body. Inclusion of such a cover member can reduce splattering of the grease to the outside of the rotary table.

In the above rotary table, the rolling elements may include first rollers and second rollers. The first rollers and the second rollers may be arranged alternately in the circumferential direction. The first rollers may have a central axis intersecting a central axis of the second rollers. By the rolling elements including the first and second rollers as described above, a rolling bearing can be configured which is suitable for supporting loads applied in a plurality of directions by the worm wheel and the inner ring.

Specific Embodiment

A specific embodiment of the rotary table of the present disclosure will be described below with reference to the drawings. In the drawings referenced below, the same or corresponding portions are denoted by the same reference numerals and the description thereof will not be repeated.

Figure 1:
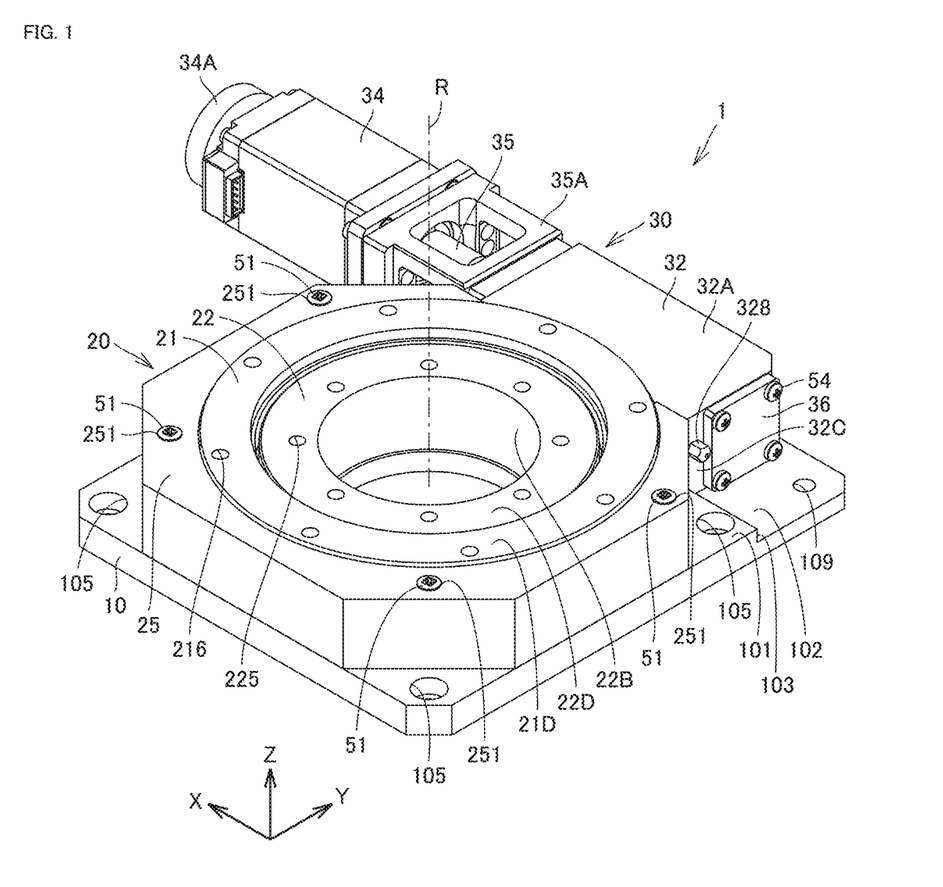
FIG. 1 is a schematic perspective view showing the structure of a rotary table.
Figure 2:
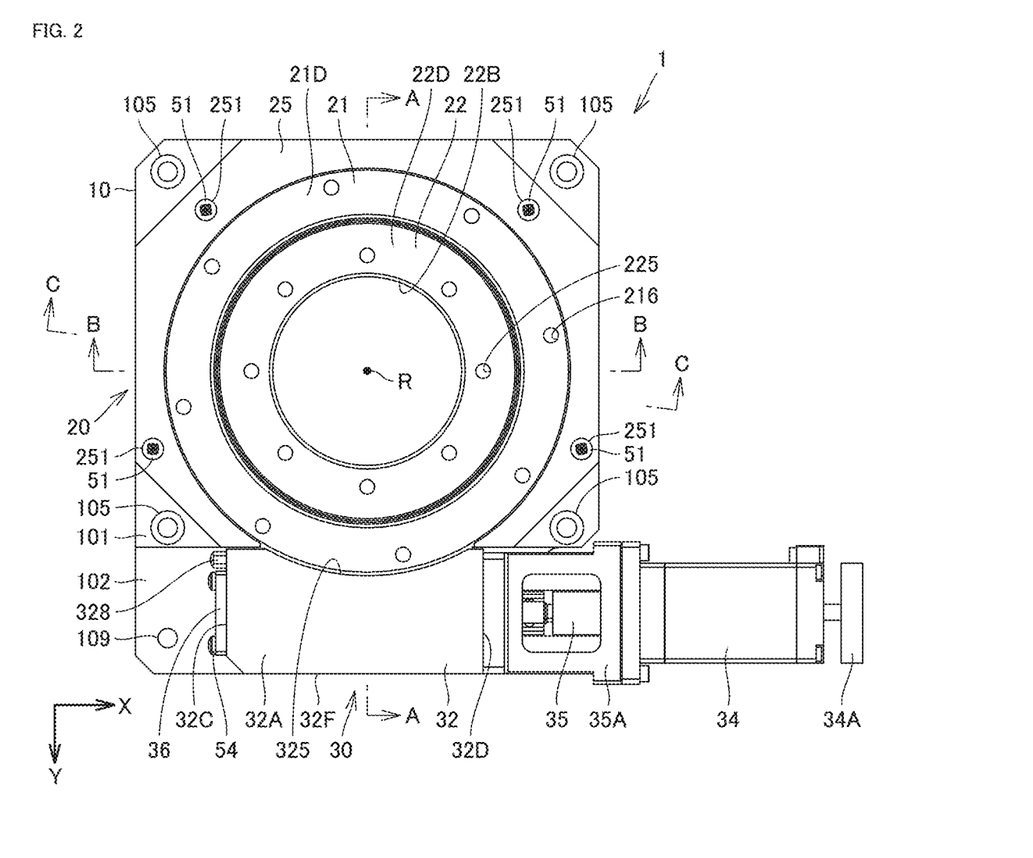
FIG. 2 is a schematic plan view showing the structure of the rotary table.
Figure 3:
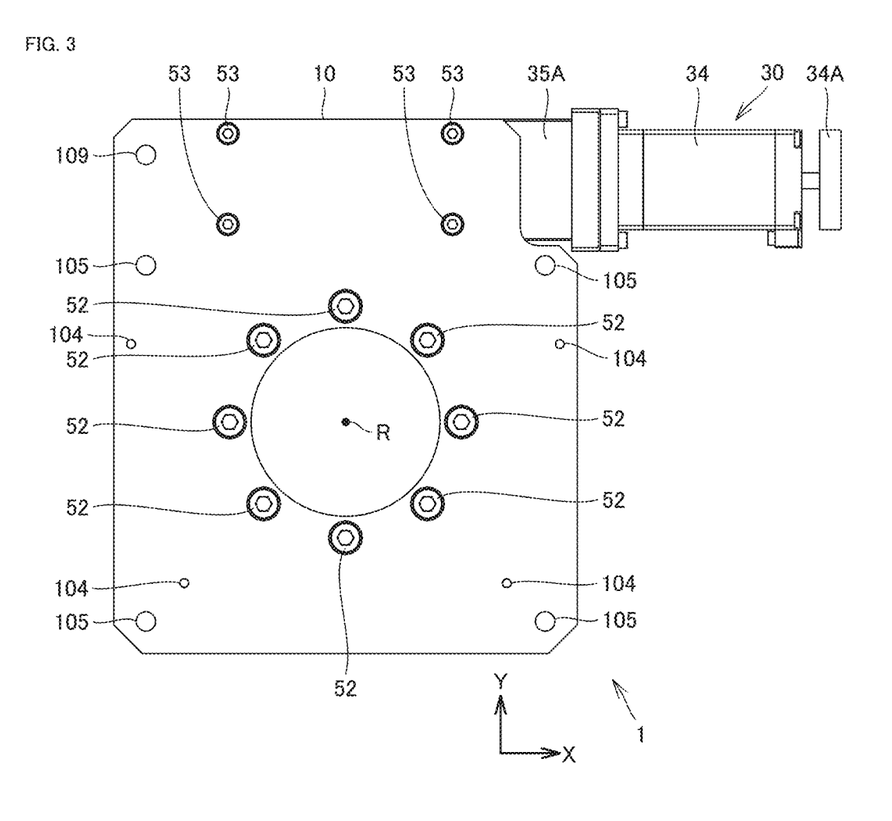
FIG. 3 is a schematic plan view showing the structure of the rotary table.
Figure 5:
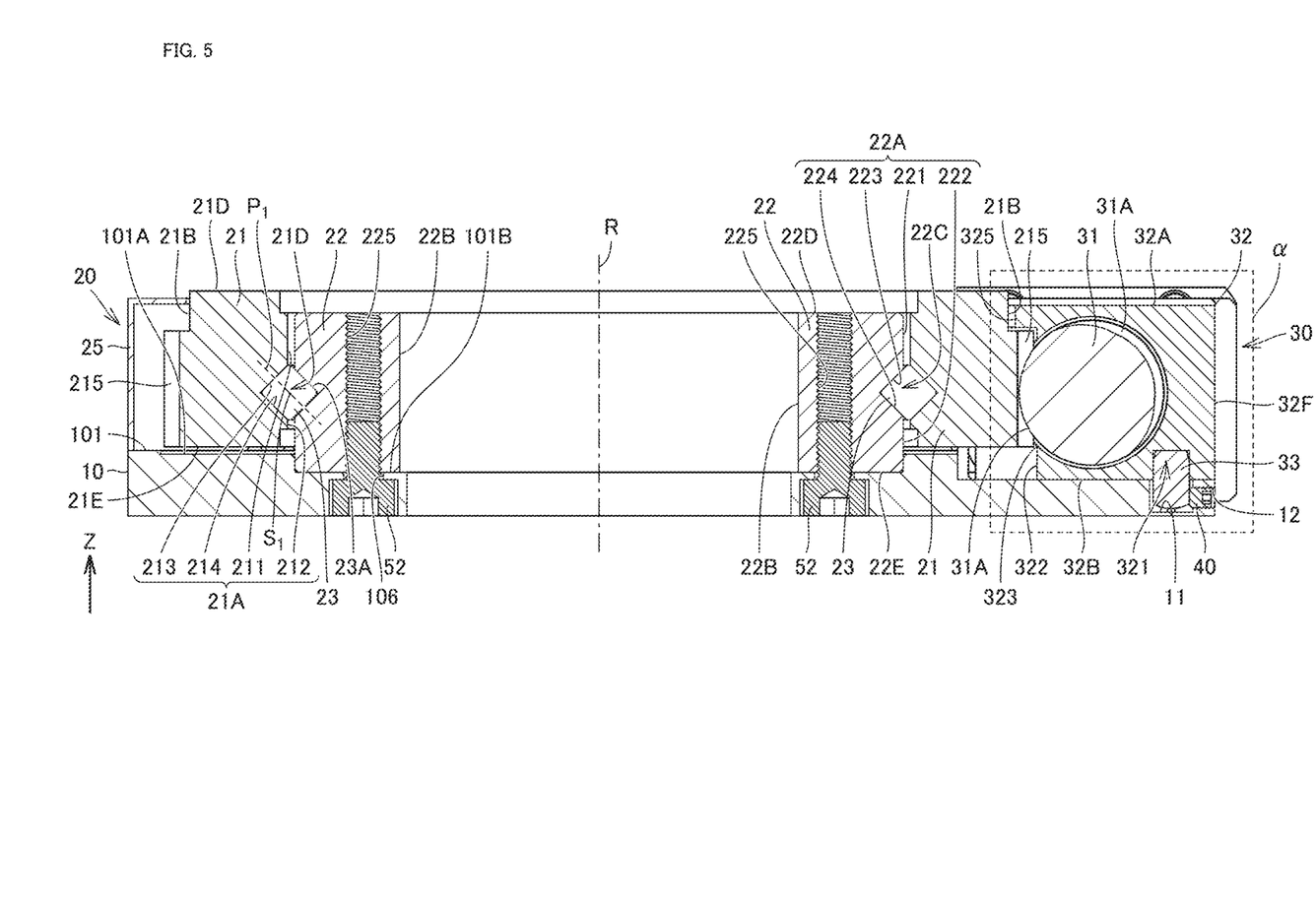
FIG. 5 is a schematic cross-sectional view showing the structure of the rotary table.
Figure 6:
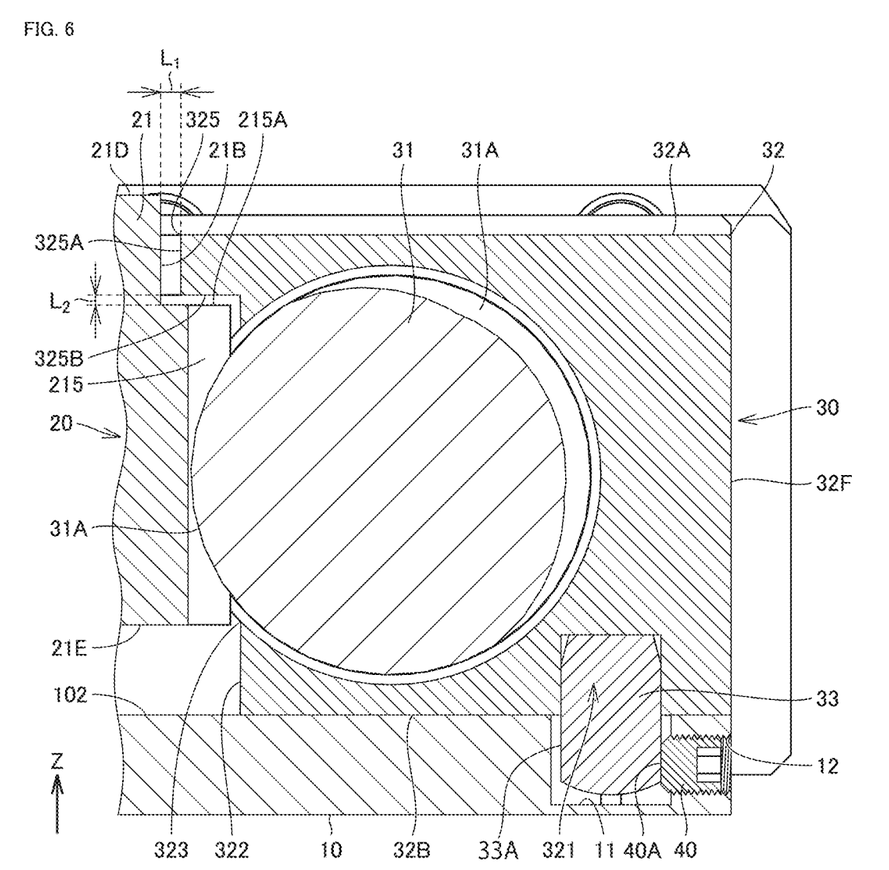
FIG. 6 is a schematic cross-sectional view showing the structure of the rotary table.
Figure 7:
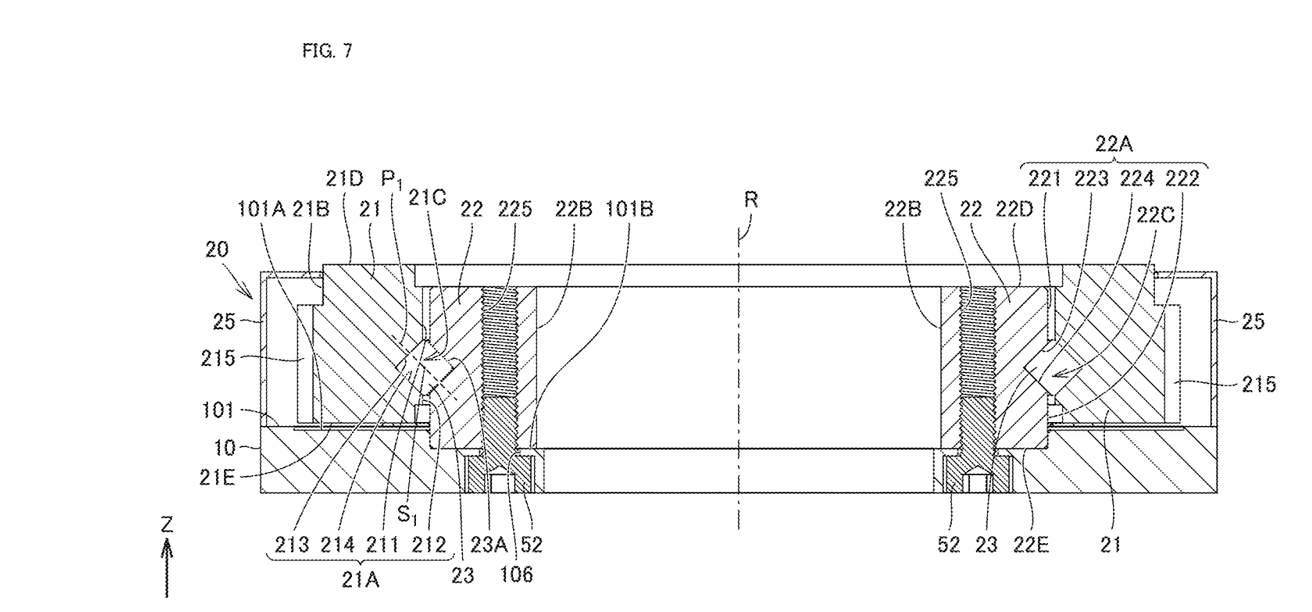
FIG. 7 is a schematic cross-sectional view showing the structure of the rotary table.
Figure 8:
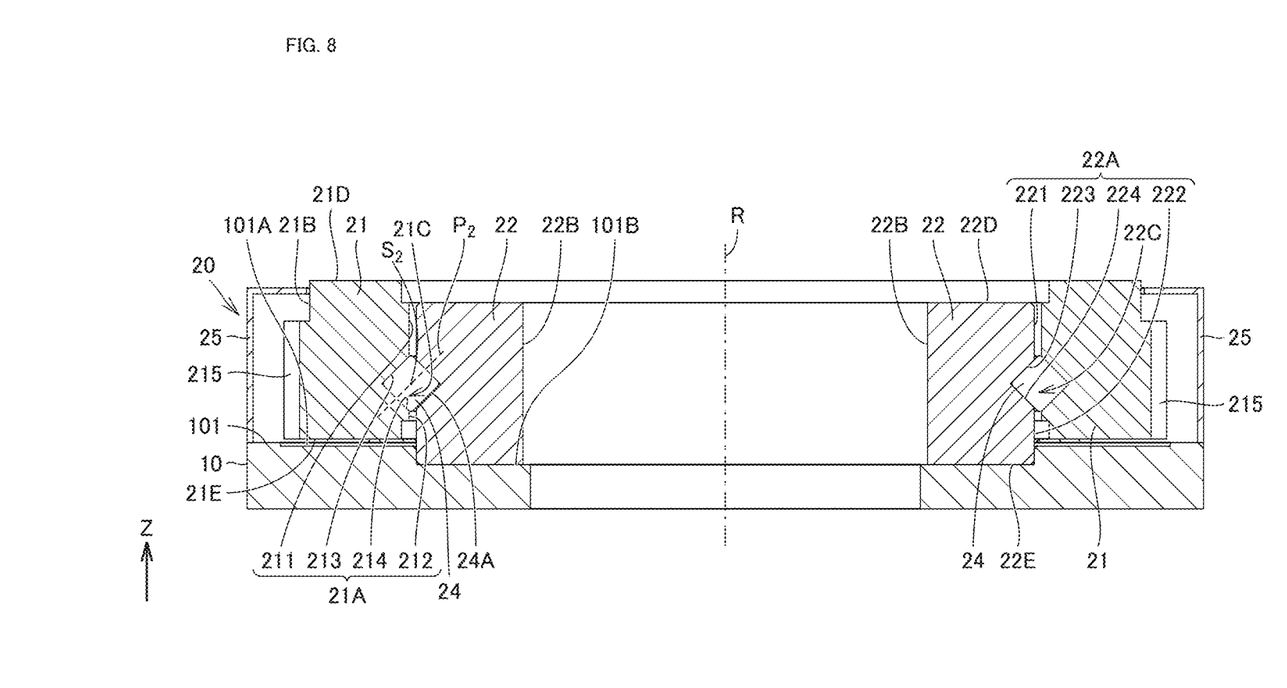
FIG. 8 is a schematic cross-sectional view showing the structure of the rotary table.
Figure 11:
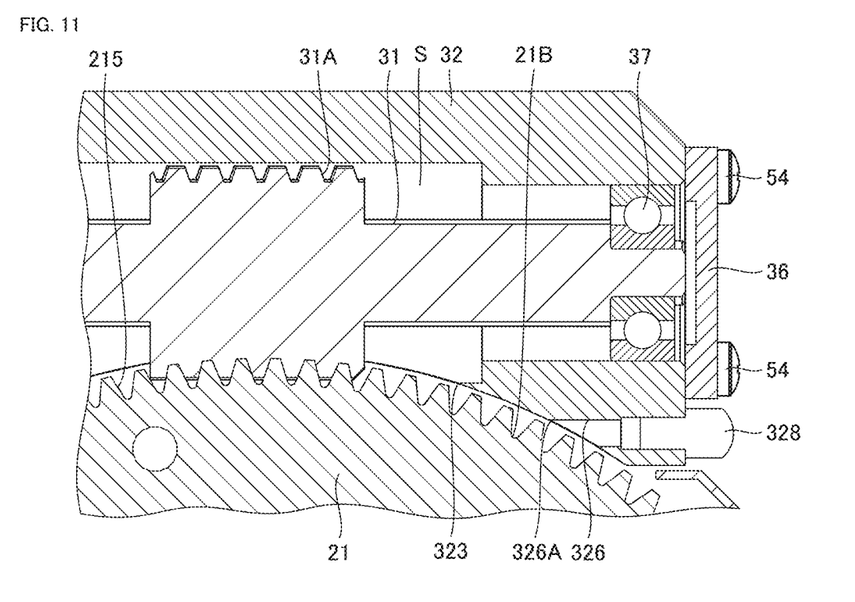
FIG. 11 is a schematic cross-sectional view showing the structure of the rotary table.
Figure 12:
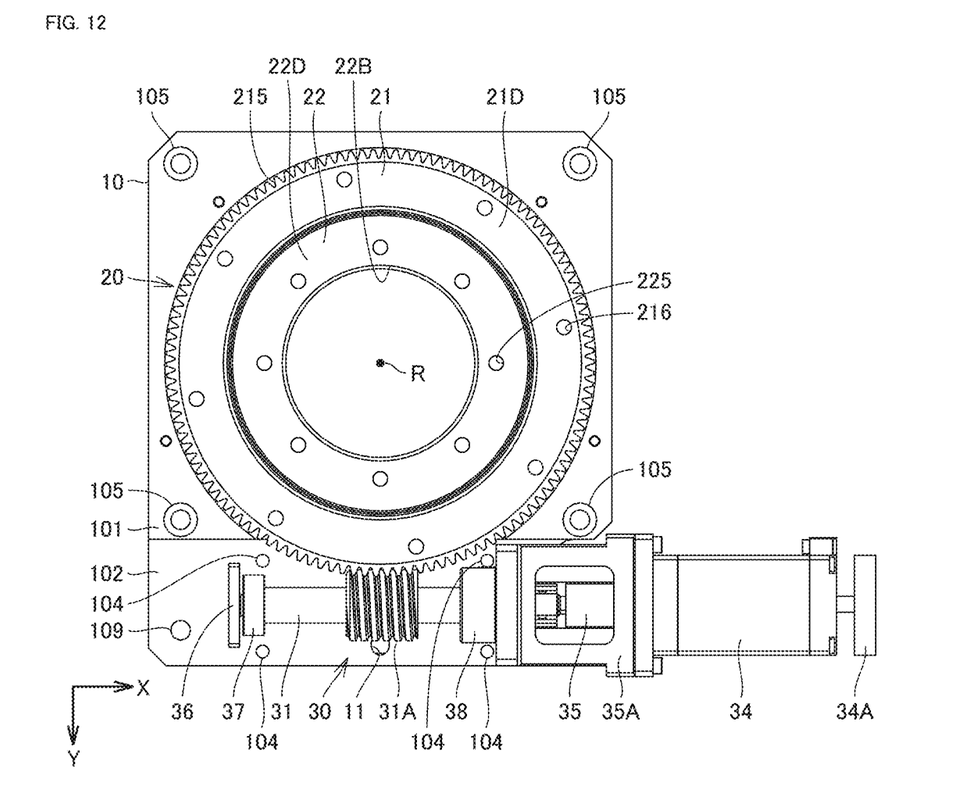
FIG. 12 is a schematic plan view showing the structure of the rotary table, with the cover member and the worm screw housing removed therefrom.

FIG. 1 is a schematic perspective view showing the structure of a rotary table in an embodiment of the present disclosure. In FIG. 1, the Z axis direction is a direction (axial direction) along which a rotational axis R of the worm wheel extends. FIG. 2 is a schematic plan view showing the structure of the rotary table. FIG. 3 is a plan view of the rotary table seen from the opposite side of FIG. 2. FIG. 5 is a cross-sectional view of the rotary table taken along A-A in FIG. 2. FIG. 6 is an enlarged cross-sectional view of a region a in FIG. 5. FIG. 7 is a cross-sectional view of the rotary table taken along B-B in FIG. 2. FIG. 8 is a cross-sectional view of the rotary table taken along C-C in FIG. 2. FIG. 11 is an enlarged cross-sectional view of the vicinity of a region where the first gear and the second gear come into contact. FIG. 12 is a plan view of the rotary table corresponding to FIG. 2, with the cover member and the worm screw housing removed therefrom.

Referring to FIGS. 1 to 3, the rotary table 1 includes a base body 10, a rolling bearing unit 20, a worm screw unit 30, and screws 51, 52, and 53.

Figure 4:
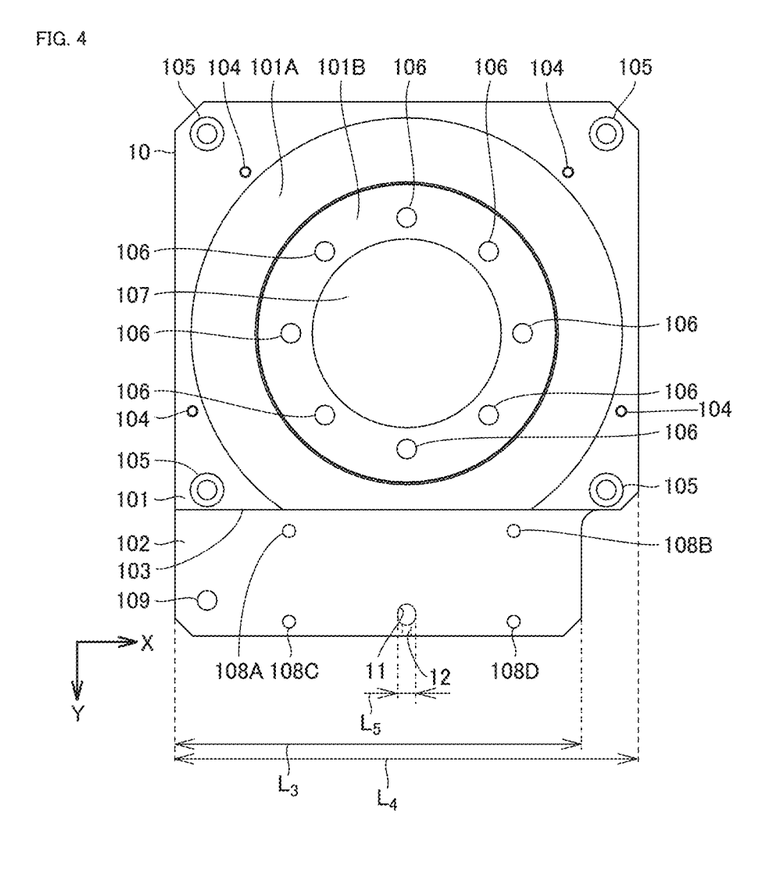
FIG. 4 is a schematic plan view showing the structure of a base body.

Referring to FIG. 1, the base body 10 has a plate-like shape. Referring to FIG. 4, the base body 10 has a first surface 101, a second surface 102 as the holding surface, and a third surface 103. In plan view in the Z axis direction, the first surface 101 and the second surface 102 are alongside of each other in the Y axis direction. Referring to FIG. 1, the region corresponding to the first surface 101 is greater in thickness than the region corresponding to the second surface 102. That is, the height of the second surface 102 in the Z axis direction is lower than the height of the first surface 101. The first surface 101 and the second surface 102 are connected via the third surface 103. Referring to FIG. 4, the first surface 101 has a planar shape. In plan view in the Z axis direction, the first surface 101 has a rectangular shape. The first surface 101 has four through holes 105 formed at the corners penetrating in the thickness direction. In the first surface 101, a through hole 107 is formed penetrating in the thickness direction. In plan view in the Z axis direction, the through hole 107 has a circular shape. In plan view in the Z axis direction, the first surface 101 has an annular recess 101B formed to surround the through hole 107. Further, a ring-shaped recess 101A is formed to surround the recess 101B. Referring to FIG. 7, the region in the first surface 101 corresponding to the recess 101A has a thickness greater than that of the region in the first surface 101 corresponding to the recess 101B. Referring to FIG. 4, the recesses 101A and 101B have shapes corresponding respectively to a worm wheel 21 and an inner ring 22 (see FIG. 1), which will be described later. The recess 101B has a plurality of (in the present embodiment, eight) screw holes 106 formed at equal intervals in the circumferential direction. The first surface 101 has, on an outer circumference side of the recess 101A, a plurality of (in the present embodiment, four) screw holes 104 formed at intervals in the circumferential direction.

Referring to FIG. 4, the second surface 102 has a rectangular shape in plan view in the Z axis direction. The second surface 102 has a length $L_3$ in the X axis direction that is shorter than a length $L_4$ in the X axis direction of the first surface 101. The second surface 102 has a planar shape. The second surface 102 has fourth through holes 108A, 108B, 108C, and 108D formed penetrating in the thickness direction. The through holes 108A, 108B, 108C, and 108D each have an inner diameter greater than an outer diameter of a threaded portion in a screw 53 (see FIG. 3), which will be described later. In the second surface 102, a first recess 11 is formed between the through hole 108C and the through hole 108D. In plan view in the Z axis direction, the first recess 11 is formed in a region that is close to a long side on the opposite side from the first surface 101 with respect to the center of the second surface 102 in the Y axis direction. A through hole 109 penetrating in the thickness direction is formed on an opposite side from the first recess 11 with respect to the through hole 108C in the X axis direction. Referring to FIGS. 4 and 6, the base body 10 has a first screw hole 12 formed in communication with the first recess 11. The first screw hole 12 extends along the Y axis direction.

Referring to FIGS. 7 and 8, the rolling bearing unit 20 includes a worm wheel 21 as an outer ring, an inner ring 22, a plurality of first rollers 23 and a plurality of second rollers 24 as a plurality of rolling elements, and a cover member 25. The worm wheel 21 is disposed on the first surface 101 of the base body 10. The worm wheel 21 is arranged to correspond to the position where the recess 101A is formed in the first surface 101. The worm wheel 21 is arranged such that the direction along the rotational axis R of the worm wheel 21 coincides with a direction (Z axis direction) perpendicular to the first surface 101. The worm wheel 21 has an annular shape.

The worm wheel 21 includes an inner circumferential surface 21A, an outer circumferential surface 21B, one end face 21D in the axial direction, and an end face 21E opposite to the end face 21D in the axial direction. The outer circumferential surface 21B has a first gear 215 formed over the entire area in the circumferential direction. The inner circumferential surface 21A includes a first region 211 and a second region 212. The first region 211 is arranged on the end face 21D side with respect to the center of the inner circumferential surface 21A in the axial direction. The second region 212 is arranged on the end face 21E side with respect to the center of the inner circumferential surface 21A in the axial direction. In the Z axis direction, an annular recessed space 21C is formed between the first region 211 and the second region 212. The space 21C is surrounded by an annular first rolling surface 213 and an annular second rolling surface 214. The first rolling surface 213 and the second rolling surface 214 intersect (orthogonally) with each other. The space 21C is formed along the rolling path of the plurality of first rollers 23 and the plurality of second rollers 24. Referring to FIGS. 1 and 2, the worm wheel 21 has a plurality of (in the present embodiment, eight) screw holes 216 formed at equal intervals in the circumferential direction.

Referring to FIGS. 7 and 8, the inner ring 22 has an annular shape. The inner ring 22 is disposed on the inner circumference side of the worm wheel 21. The inner ring 22 is arranged to correspond to the position where the recess 101B is formed in the first surface 101. The inner ring 22 includes an outer circumferential surface 22A, an inner circumferential surface 22B, one end face 22D in the axial direction, and an end face 22E opposite to the end face 22D in the axial direction. The outer circumferential surface 22A includes a third region 221 and a fourth region 222. The third region 221 is arranged on the end face 22D side with respect to the center of the outer circumferential surface 22A in the axial direction. The fourth region 222 is arranged on the end face 22E side with respect to the center of the outer circumferential surface 22A in the axial direction. In the Z axis direction, an annular recessed space 22C is formed between the third region 221 and the fourth region 222. The space 22C is surrounded by an annular third rolling surface 223 and an annular fourth rolling surface 224. The third rolling surface 223 and the fourth rolling surface 224 intersect (orthogonally) with each other. The space 22C is formed along the rolling path of the plurality of first rollers 23 and the plurality of second rollers 24. The first rolling surface 213 and the fourth rolling surface 224 oppose each other. In the present embodiment, in a cross section including the rotational axis R, the first rolling surface 213 and the fourth rolling surface 224 are arranged in parallel. The second rolling surface 214 and the fourth rolling surface 224 oppose each other. In the present embodiment, in a cross section including the rotational axis R, the second rolling surface 214 and the fourth rolling surface 224 are arranged in parallel.

Referring to FIG. 1, the inner ring 22 has a plurality of (in the present embodiment, eight) screw holes 225 formed at equal intervals in the circumferential direction. Referring to FIGS. 2 and 4, the positions where the screw holes 225 are formed are aligned with the positions where the screw holes 106 are formed in the base body 10, and the screws 52 (see FIG. 3) are screwed into the screw holes 106, 225. The inner ring 22 is thus fixed to the base body 10.

Referring to FIGS. 7 and 8, the first rollers 23 and the second rollers 24 have a cylindrical shape. The first rollers 23 and the second rollers 24 are arranged alternately in the circumferential direction. The first rollers 23 are arranged to be able to roll while contacting the second rolling surface 214 and the third rolling surface 223 at their outer circumferential surfaces 23A. The second rollers 24 are arranged to be able to roll while contacting the first rolling surface 213 and the fourth rolling surface 224 at their outer circumferential surfaces 24A. A first roller 23 has a central axis $P_1$ that intersects (is orthogonal to) a central axis $P_2$ of a second roller 24. Here, the state in which the central axis $P_1$ of the first roller 23 intersects the central axis $P_2$ of the second roller 24 means that when the center of gravity of the first roller 23 and the second roller 24 passes through a predetermined point during rotation of the worm wheel 21, the central axis $P_1$ of the first roller 23 and the central axis $P_2$ of the second roller 24 intersect (orthogonally) with each other. In this manner, the worm wheel 21 is capable of rotating around the rotational axis R with respect to the base body 10.

Referring to FIG. 7, the cover member 25 is disposed on the first surface 101. The cover member 25 is arranged on the outer circumference side of the worm wheel 21. The cover member 25 has a ring shape. The cover member 25 surrounds the first gear 215. In the present embodiment, the first gear 215 is exposed from a partial region of the cover member 25. Referring to FIG. 2, the cover member 25 has a plurality of (in the present embodiment, four) screw holes 251 formed at intervals in the circumferential direction. Referring to FIGS. 2 and 4, the positions where the screw holes 251 are formed are aligned with the positions where the screw holes 104 are formed in the base body 10, and the screws 51 are screwed into the screw holes 104, 251. The cover member 25 is thus fixed to the base body 10.

Figure 9:
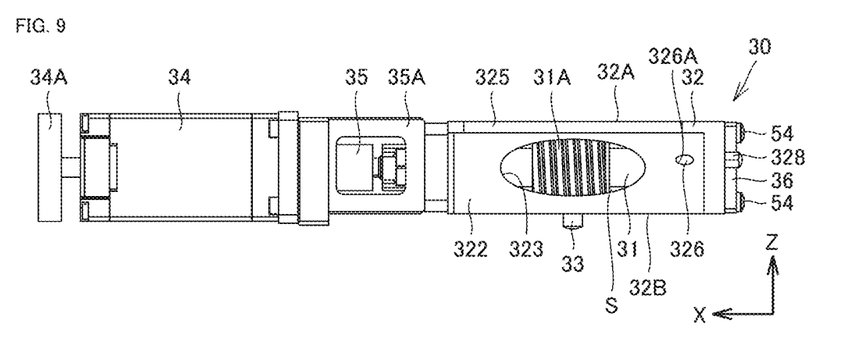
FIG. 9 is a schematic side view showing the structure of a worm screw unit.

Referring to FIG. 1, the worm screw unit 30 is disposed on the second surface 102. Referring to FIGS. 9 and 12, the worm screw unit 30 includes a worm screw 31, a worm screw housing 32, a pin 33, a motor 34, a coupling 35, a lid 36, a first support bearing 37, and a second support bearing 38. The worm screw 31 has a columnar shape. The worm screw 31 has a second gear 31A formed on its outer circumferential surface. The second gear 31A meshes with the first gear 215. The lid 36 is arranged on one end side of the worm screw 31. The worm screw 31 is supported by the first support bearing 37 so as to be rotatable with respect to the lid 36. The coupling 35 is arranged on another end side of the worm screw 31. The motor 34 is fixed to a motor housing 35A via screws. For the motor 34 in the present embodiment, for example, a stepping motor or an AC servomotor can be adopted. The worm screw 31 is supported by the second support bearing 38 so as to be rotatable with respect to the coupling 35. The worm screw 31 is connected to the motor 34 via the coupling 35. The motor 34 is electrically connected to an external power source (not shown). The motor 34 has a ring 34A for manual rotation.

Figure 10:
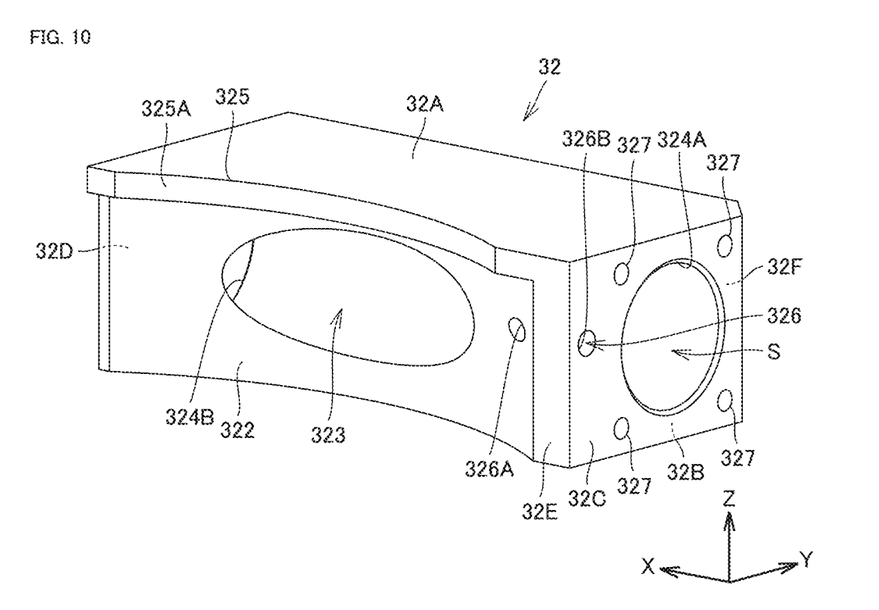
FIG. 10 is a schematic perspective view showing the structure of a worm screw housing.

Referring to FIG. 10, the worm screw housing 32 has a rectangular parallelepiped shape with an internal space S formed therein. The worm screw housing 32 includes a first outer wall surface 32A, a second outer wall surface 32B as the contacting surface, a third outer wall surface 32C, a fourth outer wall surface 32D, a fifth outer wall surface 32E, and a sixth outer wall surface 32F. The first outer wall surface 32A, the second outer wall surface 32B, the third outer wall surface 32C, the fourth outer wall surface 32D, and the sixth outer wall surface 32F have a planar shape. The first outer wall surface 32A and the second outer wall surface 32B are arranged aligned in the Z axis direction. The first outer wall surface 32A and the second outer wall surface 32B are arranged in parallel. The third outer wall surface 32C and the fourth outer wall surface 32D are arranged aligned in the X axis direction. The third outer wall surface 32C and the fourth outer wall surface 32D are arranged in parallel. The fifth outer wall surface 32E and the sixth outer wall surface 32F are arranged aligned in the Y axis direction.

Referring to FIG. 6, the second outer wall surface 32B has a recess 321 formed therein. Referring to FIG. 10, the third outer wall surface 32C has an opening 324A formed in communication with the internal space S. Four screw holes 327 are formed around the opening 324A. The fourth outer wall surface 32D has an opening 324B formed in communication with the internal space S. The fifth outer wall surface 32E has a curved (arc-shaped) opposing surface 322 recessed in the Y axis direction. The opposing surface 322 has a first through hole 323 formed in communication with the internal space S. The worm screw housing 32 has a flange portion 325 that protrudes from the opposing surface 322 in the Y axis direction. The flange portion 325 has a tip end portion 325A in its protruding direction, having a curved surface (arc) shape. The tip end portion 325A constitutes a part of the fifth outer wall surface 32E.

The worm screw housing has a lubrication hole 326 formed to penetrate from the third outer wall surface 32C to the opposing surface 322. The lubrication hole 326 has a first opening 326A on the opposing surface 322 and a second opening 326B on the third outer wall surface 32C. The first opening 326A is formed spaced apart from the first through hole 323 in the X axis direction. A grease nipple 328 (see FIG. 11) is press-fitted to seal the second opening 326B. The grease nipple 328 thus fitted facilitates adjusting the amount of grease.

Referring to FIG. 6, a cylindrical pin 33 is disposed to protrude from the second outer wall surface 32B. The pin 33 is fitted in the recess 321 in the second outer wall surface 32B. In the present embodiment, the pin 33 has an outer diameter slightly smaller than a width $L_5$ (see FIG. 4) of the first recess 11 in the X axis direction.

Referring to FIGS. 9 and 10, the positions where the screw holes 327 are formed in the worm screw housing 32 are aligned with the positions where screw holes (not shown) are formed in the lid 36, and screws 54 are screwed in. The worm screw housing 32 is thus fixed to the lid 36. Referring to FIGS. 9 and 11, the worm screw housing 32 surrounds the worm screw 31. The worm screw 31 is accommodated in the internal space S formed in the worm screw housing 32. The second gear 31A of the worm screw 31 is exposed from the first through hole 323 in the worm screw housing. Referring to FIG. 6, the second outer wall surface 32B of the worm screw housing 32 is in contact with the second surface 102 of the base body 10. The opposing surface 322 of the worm screw housing 32 is opposite to the outer circumferential surface 21B of the worm wheel 21. The second gear 31A exposed from the first through hole 323 in the opposing surface 322 meshes with the first gear 215 of the worm wheel 21.

Referring to FIG. 6, the flange portion 325 covers a side face 215A that, of the first gear 215 facing the opposing surface 322, is on the opposite side from the base body 10 in the Z axis direction. In the present embodiment, a distance $L_1$ between the side face 325A of the flange portion 325 and the outer circumferential surface 21B of the worm wheel 21 opposing the side face 325A is 1 mm or less. The distance $L_1$ is preferably 0.5 mm or more and 1 mm or less. A distance $L_2$ between a wall surface 325B of the flange portion 325 facing the side face 215A of the first gear 215 and the side face 215A of the first gear 215 is 1 mm or less. The distance $L_2$ is preferably 0.5 mm or more and 1 mm or less. Setting the distances $L_1$ and $L_2$ in the above-described range can reduce splattering of the grease to the outside of the rotary table 1. It also results in a labyrinth structure, which can reduce entry of foreign matter from the outside.

Referring to FIG. 6, the pin 33 is inserted into the first recess 11 of a long hole shape in the base body 10. The rotary table 1 further includes a hexagon socket set screw 40 as a first screw that is screwed into the first screw hole 12 in the base body 10. The hexagon socket set screw 40 has its tip end portion 40A coming into contact with an outer circumferential surface 33A of the pin 33. Referring to FIGS. 3 and 4, the positions where the through holes 108A, 108B, 108C, 108D are formed in the base body 10 are aligned with the positions where screw holes (not shown) are formed in the worm screw housing 32, and the screws 53 are screwed in. The worm screw housing 32 is thus fixed to the base body 10.

Here, in the rotary table 1 in the present embodiment, the second gear 31A is surrounded by the worm screw housing 32. Further, the side face 215A of the first gear 215 is covered by the flange portion 325. Adopting such a configuration can reduce entry of foreign matter into the region where the first gear 215 and the second gear 31A come into contact, and also reduce splattering of the grease to the outside of the rotary table 1. It can also reduce leakage of the grease, supplied from the lubrication hole 326, to the end face 21D side of the worm wheel 21. Further, providing the flange portion 325 in the worm screw housing 32 can reduce splattering of the grease, without the need of attaching a separate cover member.

In the above embodiment, the lubrication hole 326 is formed in the worm screw housing 32. The lubrication hole 326 has the first opening 326A in the opposing surface 322. The first opening 326A is formed away from the first through hole 323 in the circumferential direction of the worm wheel 21. The lubrication hole 326 extends along the X axis direction. Providing the lubrication hole 326 enables lubrication in the state where the worm screw housing 32 is fixed to the base body 10. Further, performing the lubrication, in the state where the worm wheel 21 and the worm screw 31 are rotating, from the upper side of the rotation in the region where the first gear 215 and the second gear 31A are contacting each other facilitates lubrication on the region where the first gear 215 and the second gear 31A come into contact.

In the above embodiment, referring to FIGS. 9 and 11, the first opening 326A in the lubrication hole 326 is formed on the first outer wall surface 32A side in the Z axis direction with respect to the region where the first gear 215 and the second gear 31A come into contact. Referring to FIGS. 9 and 11, the first opening 326A is formed slightly on the first outer wall surface 32A side than the center of the opposing surface 322 in the Z axis direction. In the X axis direction, the first opening 326A is formed on the third outer wall surface 32C side with respect to the first through hole 323. Adopting such a configuration allows the grease, while moving by gravity, to be supplied to the region where the first gear 215 and the second gear 31A come into contact. Therefore, the lubrication can be easily performed on the region where the first gear 215 and the second gear 31A come into contact.

In the above embodiment, the rotary table 1 is provided with the cover member 25. Providing the cover member 25 can reduce splattering of the grease to the outside of the rotary table 1.

In the above embodiment, the first rollers 23 and the second rollers 24 are adopted as the rolling elements. The first rollers 23 and the second rollers 24 may be arranged alternately in the circumferential direction. The central axis $P_1$ of the first roller 23 and the central axis $P_2$ of the second roller 24 intersect with each other. Adopting the first rollers 23 and the second rollers 24 enables configuring a rolling bearing that is suitable for supporting loads applied in a plurality of directions by the worm wheel 21 and the inner ring 22. With such a crossed roller bearing adopted, the rotary table 1 can be configured to below in profile and compact. The first rollers 23 and the second rollers 24 are inserted after removal of a lid (not shown) of the inner ring 22. While the case of adopting the first rollers 23 and the second rollers 24 as the rolling elements has been described in the above embodiment, not limited thereto, balls may be adopted as the rolling elements. While the case where the lubrication hole 326 is formed in the worm screw housing 32 has been described in the above embodiment, not limited thereto, the lubrication hole 326 may not be formed in the worm screw housing 32.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rotary table; 10: base body: 11: first recess: 12: first screw hole: 20: unit; 21: worm wheel; 21A. 22B: inner circumferential surface: 21B. 22A, 23A, 24A. 33A: outer circumferential surface; 21C. 22C: space; 21D, 21E, 22D, 22E: end face; 22: inner ring; 23: first roller: 24: second roller: 25: cover member; 30: worm screw unit; 31: worm screw: 31A: second gear: 32: worm screw housing; 32A: first outer wall surface; 32B: second outer wall surface; 32C: third outer wall surface; 32D: fourth outer wall surface; 32E: fifth outer wall surface: 32F: sixth outer wall surface: 33: pin; 34: motor; 34A: ring: 35: coupling; 35A: motor housing: 36: lid: 37: first support bearing; 38: second support bearing; 40: hexagon socket set screw; 40A, 325A: tip end portion: 51, 52, 53, 54: screw; 101: first surface; 101A, 101B, 321: recess; 102: second surface; 103: third surface: 104, 106, 216, 225, 251, 327: screw hole: 105, 107, 108A, 108B, 108C, 108D, 109: through hole; 211: first region; 212: second region; 213: first rolling surface; 214: second rolling surface; 215: first gear; 215A, 325A: side face; 221: third region; 222: fourth region; 223: third rolling surface; 224: fourth rolling surface; 322: opposing surface; 323: first through hole; 324A, 324B: opening; 325: flange portion; 325B: wall surface; 326: lubrication hole: 326A: first opening; 326B: second opening; and 328: grease nipple.

The invention claimed is:

1. A rotary table comprising:
a base body having a planar holding surface;
a worm wheel disposed on the base body to be rotatable around an axis, the worm wheel having an outer circumferential surface with a first gear formed over an entire area in a circumferential direction;
an inner ring disposed on an inner circumference side of the worm wheel and fixed to the base body;
a plurality of rolling elements disposed to be able to roll on an inner circumferential surface of the worm wheel and an outer circumferential surface of the inner ring; and
a worm screw unit fixed on the holding surface;
the worm screw unit including
a worm screw held to be rotatable around an axis, the worm screw having a second gear meshing with the first gear, and
a worm screw housing surrounding and holding the worm screw, the worm screw housing being fixed to contact the holding surface at a planar contacting surface thereof,
the worm screw housing having an opposing surface facing the outer circumferential surface of the worm wheel,
the opposing surface having a first through hole formed to expose the second gear,
the worm screw housing including a flange portion protruding from the opposing surface and covering a side face that, of the first gear facing the opposing surface, is on an opposite side from the base body in an axial direction of the worm wheel.

2. The rotary table according to claim 1, wherein
the worm screw housing has a lubrication hole formed to penetrate from an outer wall other than the opposing surface to the opposing surface,
the lubrication hole has a first opening on the opposing surface, and
the first opening is formed away from the first through hole in the circumferential direction of the worm wheel.

3. The rotary table according to claim 1, further comprising a cover member disposed to surround the first gear and fixed to the base body.

4. The rotary table according to claim 1, wherein
the rolling elements include first rollers and second rollers,
the first rollers and the second rollers are arranged alternately in the circumferential direction, and
the first rollers have a central axis intersecting a central axis of the second rollers.

* * * * *